US009299188B2

(12) United States Patent
Karsch et al.

(10) Patent No.: US 9,299,188 B2
(45) Date of Patent: Mar. 29, 2016

(54) AUTOMATIC GEOMETRY AND LIGHTING INFERENCE FOR REALISTIC IMAGE EDITING

(71) Applicant: Adobe Systems Incorporated, San Jose, CA (US)

(72) Inventors: Kevin Karsch, Champaign, IL (US); Kalyan Sunkavalli, San Jose, CA (US); Sunil Hadap, Cupertino, CA (US); Nathan Carr, San Jose, CA (US); Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 357 days.

(21) Appl. No.: 13/962,604

(22) Filed: Aug. 8, 2013

(65) Prior Publication Data

US 2015/0043806 A1    Feb. 12, 2015

(51) Int. Cl.
*G06T 15/50* (2011.01)
*G06T 7/00* (2006.01)
*G06T 19/20* (2011.01)
*G06T 11/60* (2006.01)

(52) U.S. Cl.
CPC .............. *G06T 15/50* (2013.01); *G06T 7/0061* (2013.01); *G06T 11/60* (2013.01); *G06T 19/20* (2013.01); *G06T 2207/10024* (2013.01); *G06T 2207/10028* (2013.01); *G06T 2219/2021* (2013.01)

(58) Field of Classification Search
CPC ... G06T 7/0051; G06T 7/0053; G06T 7/0061; G06T 7/0073; G06T 11/60; G06T 15/50; G06T 19/20; G06T 2207/10028
See application file for complete search history.

(56) References Cited

U.S. PATENT DOCUMENTS

| 5,517,580 | A  | * | 5/1996 | Markandey | G01N 25/72 348/164 |
| 6,636,627 | B1 | * | 10/2003 | Oosawa | G06K 9/4661 345/426 |
| 8,036,451 | B2 | * | 10/2011 | Redert | G06T 7/0051 382/153 |
| 8,289,318 | B1 | * | 10/2012 | Hadap | G06T 17/20 345/419 |
| 8,687,001 | B2 | * | 4/2014 | Shim | G06T 15/50 345/426 |

(Continued)

OTHER PUBLICATIONS

Wang et al. (2008) "Estimation of multiple directional illuminants from a single image." Image and Vision Computing, vol. 26 pp. 1179-1195.*

(Continued)

*Primary Examiner* — Andrew W Johns
(74) *Attorney, Agent, or Firm* — Finch & Maloney PLLC (57) ABSTRACT

Image editing techniques are disclosed that support a number of physically-based image editing tasks, including object insertion and relighting. The techniques can be implemented, for example in an image editing application that is executable on a computing system. In one such embodiment, the editing application is configured to compute a scene from a single image, by automatically estimating dense depth and diffuse reflectance, which respectively form the geometry and surface materials of the scene. Sources of illumination are then inferred, conditioned on the estimated scene geometry and surface materials and without any user input, to form a complete 3D physical scene model corresponding to the image. The scene model may include estimates of the geometry, illumination, and material properties represented in the scene, and various camera parameters. Using this scene model, objects can be readily inserted and composited into the input image with realistic lighting, shadowing, and perspective.

21 Claims, 6 Drawing Sheets

(56) References Cited

U.S. PATENT DOCUMENTS

| | | | | |
|---|---|---|---|---|
| 2002/0128060 A1* | 9/2002 | Belhumeur | ............. | G06T 17/10 463/25 |
| 2006/0103728 A1* | 5/2006 | Ishigami | ............. | H04N 1/6027 348/180 |
| 2010/0046802 A1* | 2/2010 | Watanabe | ............... | G01S 17/36 382/106 |
| 2013/0121567 A1* | 5/2013 | Hadap | .................... | G06T 15/50 382/162 |
| 2013/0147798 A1* | 6/2013 | Karsch | ................. | G06T 19/006 345/420 |

OTHER PUBLICATIONS

Lopez-Moreno et al. (2010) "Compositing images through light source detection." Computers & Graphics, vol. 34 pp. 698-707.*

Karsch et al. (2011) "Rendering synthetic objects into legacy photographs." ACM Trans. on Graphics, vol. 30 No. 6, Article 157.*

Neverova et al. (Oct. 13, 2012) "Lighting estimation in indoor environments from low-quality images." Proc. ECCV 2012, LNCS 7584, pp. 380-389.*

Karsch et al. (May 2014) "Automatic scene inference for 3d object compositing." ACM Trans. on Graphics, vol. 33 No. 3, Article 32.*

Khan et al. (2006) "Image-based material editing." ACM Trans. on Graphics, vol. 25 No. 3, pp. 654-663.*

Lee et al. (2009) "Geometric reasoning for single image structure recovery." Proc. 2009 IEEE Conf. on Computer Vision and Pattern Recognition, pp. 2136-2143.*

Bell, et al., "Learing local evidence for shading and reflectance," Mitsubishi Electric Research Laboratores—http://www.merl.com, TR2001-04, Dec. 2001, 12 pages.

Grosse, et al., " Ground truth dataset and baseline evaluations for intrinsic image algorithms," Computer Vision, 2009 IEEE 12th International Conference, MIT Open Access Articles; http://dx.doi.org/10.1109/ICCV.2009.5459428, accessed Jul. 5, 2013, 9 pages.

Karsch, et al., "Rendering Synthetic Objects into Legacy Photographs," University of Illinois at Urbana-Champaign, {karsch 1, vhedau2, daf, dhoiem} © uiuc.edu, presented at SIGGRAPH Asia, 2011, 12 pages.

Karsch, et al., "Depth Extraction from Video Using Non-parametric Sampling," University of Illinois at Urbana-Champaign, Microsoft Research New England and Microsoft Research, http://kevinkarsch.com/depthtransfer, presented at ECCU 2012, 14 pages.

Karsch, et al.,"Depth Extraction from Video Using Non-parametric Sampling—Supplemental material," University of Illinois at Urbana-Champaign, Microsoft Research New England and Microsoft Research, http://kevinkarsch.com/depthtransfer, presented at ECCU 2012, 11 pages.

Khan, et al., "Image-Based Material Editing," University of Central Florida, University of Bristol and Max Planck Institute for Biological Cybernetics, presented at ACM SIGGRAPH 2006 Papers, 10 pages.

Lee, et al, "Geometric Reasoning for Single Image Structure Recovery" (2009). Robotics Institute. Paper 323. http://repository.cmu.edu/robotics/323, 9 pages.

* cited by examiner

FIG. 1a — Input Image

FIG. 1b — Object to be inserted; Cursor

FIG. 1c — Inserted objects; Output Image

AUTOMATIC GEOMETRY AND LIGHTING INFERENCE FOR REALISTIC IMAGE EDITING

FIELD OF THE DISCLOSURE

This disclosure relates to digital image editing, and more particularly, to techniques for automatic geometry and lighting inference for realistic image editing.

BACKGROUND

Many photo editing applications allow a user to insert three-dimensional meshed characters, props, or other synthetic objects into images. There are a number of non-trivial issues associated with such photo editing.

DETAILED DESCRIPTION

Image editing techniques are disclosed that support a number of physically-based image editing tasks, including object insertion and relighting. The techniques can be implemented, for example in an image editing application that is executable on a computing system. The application may be installed locally on the computing system, or remotely provisioned to the computing system via a server. In one such embodiment, the editing application is configured to compute a scene from a single image, by automatically estimating dense depth and diffuse reflectance, which respectively form the geometry and surface materials of the scene. Sources of illumination are then inferred, conditioned on the estimated scene geometry and surface materials and without any user input, to form a complete three-dimensional physical scene model corresponding to the given target image. The resulting scene model may include, for example, estimates of the geometry, illumination, and material properties represented in the scene of the target image, as well as various camera parameters such as orientation and focal length. Using this scene model, objects can then be readily inserted and composited into the input image with realistic lighting, shadowing, and perspective. The process is automated and the user of the image editing application need not have any artistic ability. The user can insert an object into a given image using any number of suitable user interface mechanisms such as copy-and-paste and cursor location based insertion command. As will be appreciated in light of this disclosure, techniques employed by the system may also be used independently of the system or other techniques provided herein. For instance, various methodologies are provided for automatically estimating illumination sources associated with a digital image depicting a scene. Likewise, various methodologies are provided for automatically estimating dense depth associated with a digital image depicting a scene.

General Overview

As previously mentioned, there are a number of non-trivial issues associated with photo editing. For example, many photo editing applications allow a user to insert three-dimensional (3D) meshed characters, props, or other synthetic objects into images. In such existing photo editors, it is generally the job of the user to create photorealistic effects by recognizing the physical space present in an image. For example, to insert a new 3D object into a given image, the user must determine how the object will be lit, where shadows will be cast, and the perspective at which the inserted object will be viewed. Achieving these edits with existing editor applications is a painstaking process that takes a great deal of artistry and expertise, which in turn significantly limits the number of people that can achieve realistic edited imagery involving the insertion of objects. Further note that, to facilitate realistic object insertion and rendering, it is necessary to hypothesize camera parameters, scene geometry, surface materials, and sources of illumination.

Thus, and in accordance with an embodiment of the present invention, techniques are disclosed for automatically inferring a 3D physical scene model corresponding to a given target image with little or no user interaction or additional information. The 3D scene model can then be used to facilitate photorealistic, physically grounded image editing operations like object insertion and relighting. The 3D scene model may include, for example, estimates of the geometry (e.g., depth), illumination (e.g., location of light sources), and material properties (e.g., diffuse albedo or surface reflectance) represented in the target image, as well as various camera parameters (e.g., center of projection, rotation, and focal length). The target image can be, for instance, a single legacy low dynamic range (LDR) photograph, or any other given digital image whether generated by scanning a hard copy image or by a digital camera or other imaging device (e.g., frame of digital video generated by a video camera).

As will be appreciated in light of this disclosure, the techniques may be embodied, for example, in an image editing system that supports a number of physically-based image editing tasks, including object insertion and relighting. In accordance with one such embodiment, to compute or otherwise recover a comprehensive 3D scene model from a single image (e.g., an LDR photograph), the system is configured to automatically estimate dense depth and diffuse reflectance, which can be used to form the geometry and source material models of the scene. Sources of illumination can then be inferred, conditioned on the estimated scene geometry and source material models and without any user input, to form a complete 3D scene model of the target image. The image editing system can then use this automatically generated 3D scene model to insert and composite an object into the image with realistic lighting, shadowing, and perspective.

In one such example embodiment, the system includes a Depth Estimation Module configured to combine data-driven depth transfer with geometric reasoning to provide a geometry model that reflects the scene layout of the image, a Diffuse Reflectance Module configured to estimate a spatially-varying diffuse material albedo for the visible scene surface materials of the image to provide a surface materials model, and an Illumination Source Estimation Module configured to render a full lighting 3D model of the scene (including light sources that are outside the field-of-view), based on the geometry model and surface materials model.

Figure 1A:
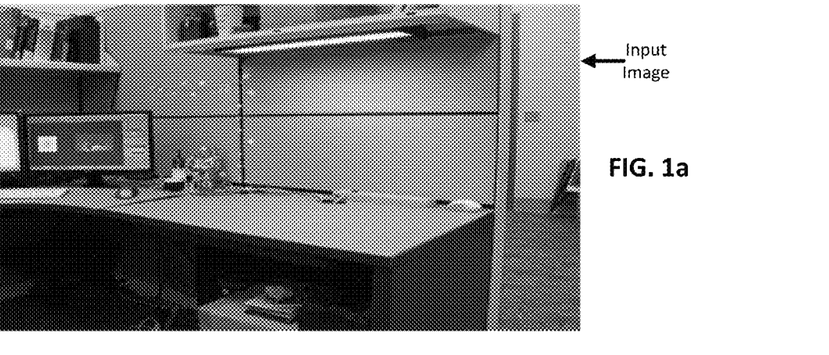
FIG. 1a illustrates an example legacy low dynamic range (LDR) photograph that can be used as an input image to be edited.
Figure 1B:
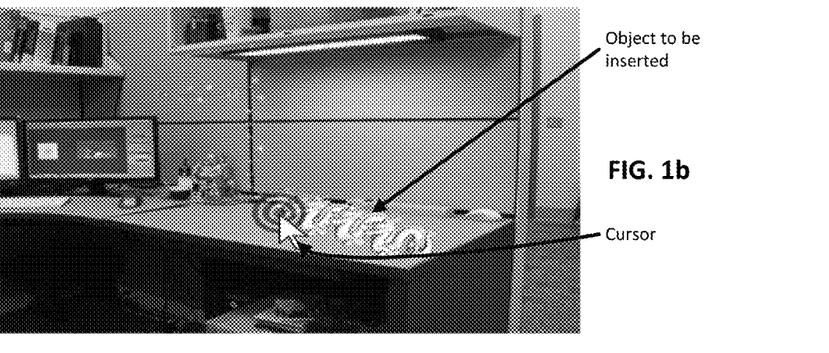
FIG. 1b illustrates an object being inserted into the image of FIG. 1a, in accordance with an embodiment of the present invention.
Figure 1C:
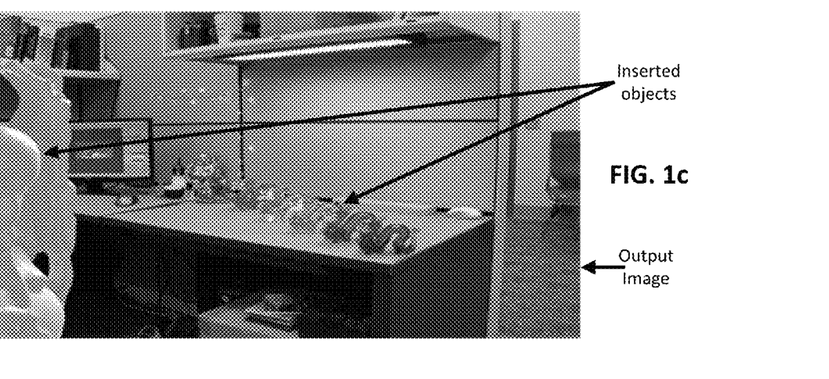
FIG. 1c illustrates an edited version of the image of FIG. 1a, wherein two objects have been inserted and relit, in accordance with an embodiment of the present invention.

This automatic modeling process of the image editing system can be initiated, for example, in response to the user indicating a desire to insert a digital object into a given image. FIG. 1a illustrates an example input image that a user might wish to modify via object insertion. In one example such embodiment, this desire can be indicated via a point-and-click action where the user points and clicks a location in the image where the user wishes to insert that object, as shown in FIG. 1b. The point-and-click action can be executed, for example, using a mouse or trackpad. In a similar fashion, the user may use a finger or stylus based tap-and-release action at the desired location using a touch screen interface. Upon release of the user action (e.g., when the mouse click occurs or when the tap is released), the automatic 3D scene modeling, object insertion, and relighting process commences. FIG. 1c illustrates an edited version of the image of FIG. 1a, wherein two objects have been inserted and relit, in accordance with an embodiment of the present invention. In other cases, any suitable user interface mechanisms can be used to initiate the object insertion process. In addition, or alternatively, the 3D scene models of given images can be computed in advance and subsequent object insertion operations can be executed using those models. Numerous other variations will be appreciated in light of this disclosure.

Thus, an image editing application can use the automatically generated 3D scene model to seamlessly insert an object into a given photograph and relight the modified scene. In this way, the image editor allows a user having no artistic ability to make physically grounded edits to photographs using typical computing system user interface controls (e.g., mouse clicks, touch screen gestures, etc). The process is automatic, and requires no special hardware, and works for legacy (existing) images.

Methodology and Architecture

Figure 2:
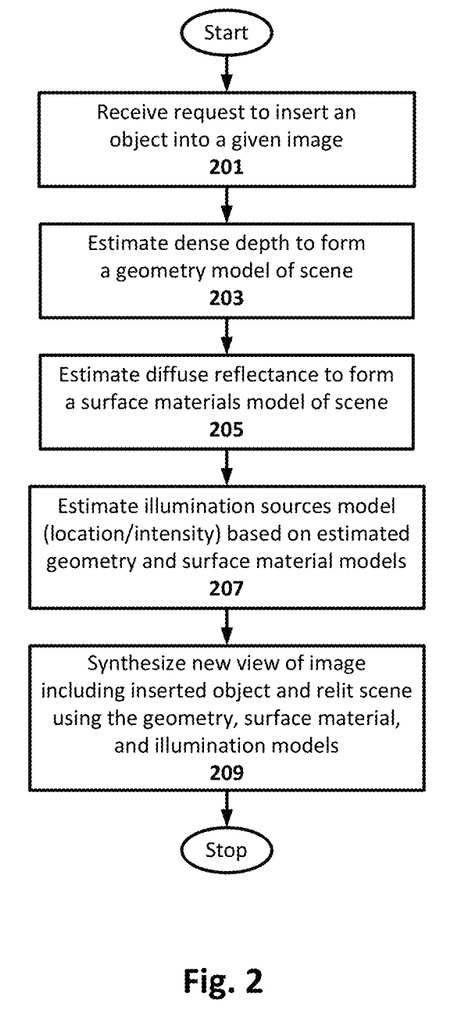
FIG. 2 illustrates a process for inserting an object into an image, in accordance with an embodiment of the present invention.

FIG. 2 illustrates a process for inserting an object into an image, in accordance with an embodiment of the present invention. The method can be carried out, for example, via an image editing application locally installed on a user's computing system, or in the context of a client-server architecture where an application server remotely provides the user's computing system (client) access to an image editing application or cloud-based service over a communication network (e.g., user's local area network and/or Internet). In any such cases, the application can be configured to allow a user to, among other things insert a digital object into a given digital image. The image editing application may also allow other editing operations as well (e.g., color changes, cropping, or other typical imaging editing operations), and may be part of an overall digital media application.

The method will be described with further reference to FIG. 3, which illustrates an image editing system configured to carry out the method, in accordance with an embodiment of the present invention. As can be seen, the system includes an image editing application executable on a user's computing system, and can be provisioned locally, remotely or some combination thereof, as previously explained. The image editing application includes a number of functional modules, including an Input/Request Module, a Depth Estimation Module, a Diffuse Reflectance Module, an Illumination Source Estimation Module, and a View Synthesis Module. As will be appreciated, the functional modules of the system can be implemented in software, firmware, hardware or any combination thereof.

The method includes receiving 201 a request to insert a digital object into a given digital image. As previously explained, this request may be indicated, for example, by a user input action such as a point-and-click or press-and-release operation, or the selection of an 'insert object' user interface control that causes a number of directional prompts to be provided to the user so as to guide the object insertion process. Given that the placement of the object will determine the factors relevant to compositing and relighting the modified scene, the insertion process described herein need not commence until placement of the object, in accordance with an embodiment. However, in other embodiments, note that the insertion process can execute in real-time as the user moves the object around and/or over the target input image. The Input Request Module of FIG. 3 can be programmed or otherwise configured to carry out the receiving 201.

The method continues with estimating 203 dense depth to form a geometry model of the scene. In one example case, geometric reasoning is used to recover the image structure, wherein camera focal length and a sparse surface orientation map of the imaged scene are estimated. Facilitated by a dataset of RGB-D images (red, green blue color space, with depth data), a non-parametric depth sampling approach is applied to compute the per-pixel depth of the scene. The geometric cues are used during inference to enforce orientation constraints, piecewise-planarity, and surface smoothness. The result is a geometry model that represents a dense reconstruction of the scene that is suitable for realistic, physically grounded editing. The Depth Estimation Module of FIG. 3 can be programmed or otherwise configured to carry out the estimating 203 and to provide the geometry model, and will be discussed in further detail with reference to FIGS. 4a-b.

As can be seen with further reference to FIG. 2, the method continues with estimating 205 diffuse reflectance to form a surface materials model of the scene. In one example embodiment, a color retinex algorithm is used to estimate a spatially-varying diffuse material albedo for each pixel in the visible scene. In general, the color retinex algorithm is effectively a learning-based approach that uses intrinsic image decomposition to retrieve so-called intrinsic properties of a given image, such as shading and reflectance. In more detail, and in accordance with one example embodiment of the present invention, the color retinex algorithm as described in Grosse, R. et al. "Ground truth dataset and baseline evaluations for intrinsic image algorithms" IEEE 12$^{th}$ International Conference on Computer Vision, 2009, pp. 2335-2342, is used to estimate diffuse reflectance from a given image to form a surface materials model of the imaged scene. With the Grosse-based color retinex algorithm, an image for each of a variety of specific real-world physical objects is separated into three components including Lambertian shading, reflectance, and specularities, so as to provide a dataset of intrinsic image decompositions for those various objects. The Lambertian shading component accounts for shading effects in the image, including shading due to geometry as well as shadows and inter-reflections. The reflectance component, or albedo, represents how the material of the object in the image reflects light independent of viewpoint and illumination. The specular component accounts for highlights that are due to viewpoint, geometry and illumination. The three-way decomposition can be expressed as $I(x)=S(x)R(x)+C(x)$, where $I(x)$ is the observed intensity at pixel x, $S(x)$ is the illumination, $R(x)$ is the albedo, and $C(x)$ is the specular term. The dataset can then be used to evaluate other images. Thus, Lambertian shading, reflectance, and specularities components of a given input image can be identified and compared against the established data set, so that surface materials depicted in the given image can be estimated based on the surface materials of the known dataset. As will be appreciated in light of this disclosure, other embodiments may use different data sets and the claimed invention is not intended to be limited to a dataset based on any specific objects. Rather, the training set of images can be based on any set of arbitrary objects that will provide a meaningful representation of typical surface materials. So, in one example embodiment, the Diffuse Reflectance Module of FIG. 3 can be programmed or otherwise configured to carry out the estimating 205 and to provide the surface materials model, by estimating a spatially-varying diffuse material albedo for each pixel in the visible scene, based on comparison to the decomposed dataset.

The method continues with estimating 207 an illumination sources model (location/intensity) based on estimated geometry and surface material models. In accordance with one embodiment, this entails detecting light sources in the input image with automatic thresholding, and then pruning those detected light sources using the inferred depth of the geometry model (e.g., removing detections if they lie on the floor or other unlikely location for an illumination source). In addition, a dataset of image-based lights (spherical high dynamic range or so-called HDR images) can be used to estimate light outside of the view frustum. Each spherical image is sub-sampled into many rectilinear projections and matched to the input image. The top matching candidate image based lights (IBLs) can be used as distinct sources of light. Thus, the resulting illumination sources model accounts for lighting sources of the input image within and outside the view frustum. In addition, the identified light source intensities can be optimized (using the surface materials model) to produce a rendering of the scene that closely matches the input image. The Illumination Source Estimation Module of FIG. 3 can be programmed or otherwise configured to carry out the estimating 207 and to provide the rendered 3D scene model, and will be discussed in further detail with reference to FIGS. 5a-b.

As will be appreciated in light of this disclosure, the 3D scene model generated by the method can be used to facilitate object insertion into the image. To this end, and with further reference to FIG. 2, the method may continue with synthesizing 209 a new view of the image including the inserted object and relit scene using the overall 3D scene model that reflects each of the geometry, surface material, and illumination models, collectively, the 3D scene model. This synthesizing may commence, for example, upon releasing of the user action (assuming a point-and-click or tap-and-release type action, for instance) at the desired location on the input image. In a more general sense, the synthesizing may commence with a user input indicating commitment to a target location on the image, wherein that commitment may be indicated by a click of a point-and-click operation, or by placement of the cursor at the target image location and selection of an insert button (physical or virtual), or by placement of the cursor at the target image location and a voice command (e.g., 'drop'), or by a tap of a stylus or finger at the target image location (assuming a touch screen interface), or any other suitable user input mechanism that can be used to identify and commit to a target location on a given image where an object can be inserted. The View Synthesis Module of FIG. 3 can be programmed or otherwise configured to carry out the synthesizing 209 and to provide the edited image.

As will be appreciated in light of this disclosure, the term 'model' with respect to each of the illumination sources model, geometry model, and surface material model, as well as the overall 3D scene model, is not intended to imply any particular form or data structure, but is simply used herein as a designation associated with a particular data output of a process or module. Further note that the overall 3D scene model may be, for instance, an aggregation of the data represented in each of the illumination sources model (location/intensity), geometry model (dense depth and focal point), and surface material model (albedo reflectance), and any other data typically needed to render an image.

Figure 3:
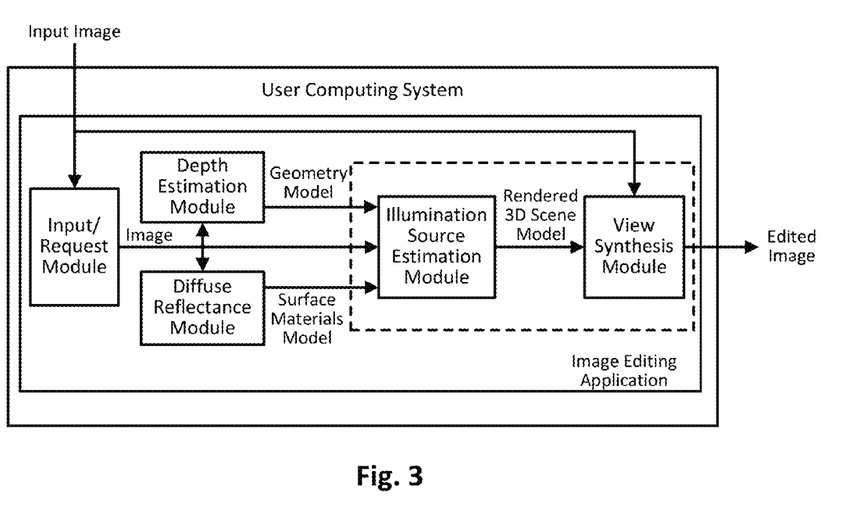
FIG. 3 illustrates an image editing system configured to perform physically grounded image editing, including object insertion, relighting, new view synthesis, in accordance with an embodiment of the present invention.

Note the degree of modularity with respect to the system shown in FIG. 3 can vary from one embodiment to the next. For instance, the Illumination Source Estimation Module and the View Synthesis Module are shown as distinct modules, but their collective functionality can be implemented in a single module, or three or more modules. In a similar fashion, the overall functionality of the system can be implemented in one or more modules and/or sub-modules, or otherwise differently than depicted in the example shown in FIG. 3.

Depth Estimation

As will be appreciated light of this disclosure, depth estimation is one of the functions involved in single image reconstruction or modeling, in accordance with an embodiment of the present invention. In general, this depth estimation can be carried out by estimating a sense of the physical space about the scene, which can be encoded with a depth map, camera parameters, and spatially-varying diffuse materials. The depth estimation adheres to geometric intuition about the scene of the given image.

Figure 4A:
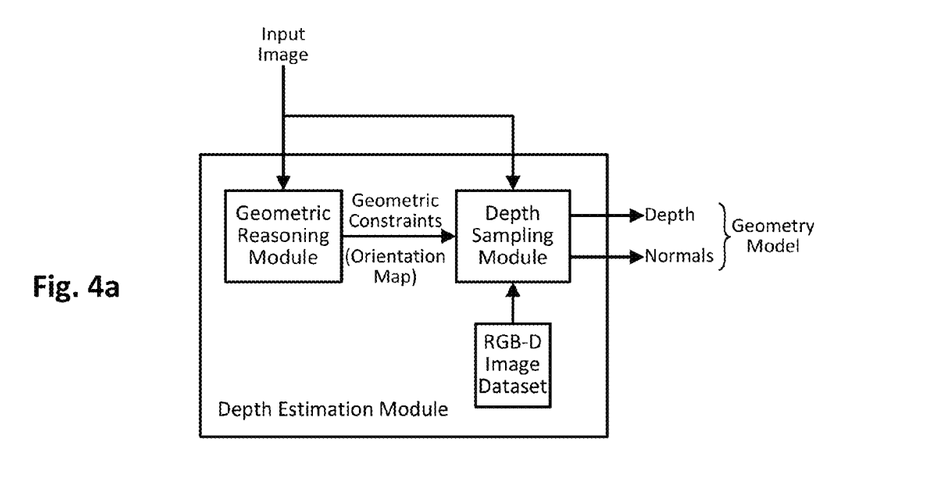
FIG. 4a illustrates a Depth Estimation Module of the image editing system shown in FIG. 3, configured in accordance with an embodiment of the present invention.
Figure 4B:
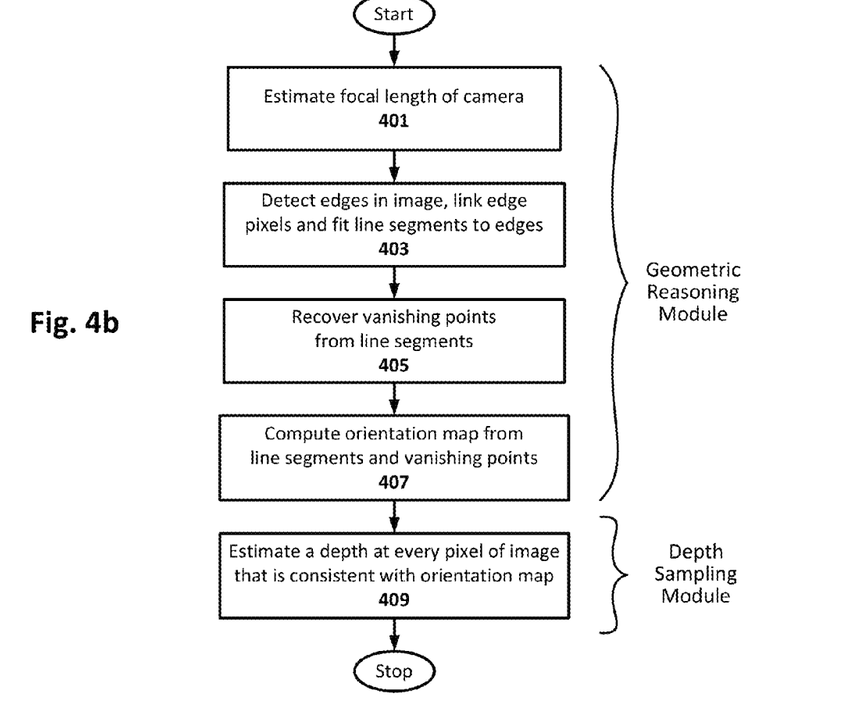
FIG. 4b illustrates a depth estimation methodology that can be implemented by the Depth Estimation Module shown in FIG. 4a, configured in accordance with an embodiment of the present invention.

FIG. 4a illustrates the pipeline of the depth estimation algorithm in accordance of one embodiment, and FIG. 4b illustrates an example depth estimation methodology that can be implemented by that pipeline. As can be seen in FIG. 4a, the Depth Estimation Module includes a Geometric Reasoning Module, a Depth Sampling Module, and a RGBD image dataset. As previously explained, each of these modules may be implemented, for example, in software, hardware, firmware or any combination thereof, and the degree of modularity may vary from one embodiment to the next, with the overall resulting functionality being as variously described herein.

In operation, and with further reference to FIGS. 4a and 4b, the Geometric Reasoning Module is configured to receive the input image, and to estimate 401 the focal length of the camera and a sparse surface orientation map based on geometric constraints depicted in the image. In particular, the Geometric Reasoning Module is further configured to detect 403 edges in the input image, and to link edge pixels and fit line segments to those edges. With respect to the sparse surface orientation map, the Geometric Reasoning Module is further configured to then recover 405 vanishing points from the identified line segments, and to compute 407 the orientation map from the line segments and vanishing points. Facilitated by a dataset of RGB-D images, the Depth Sampling Module is configured to then apply a non-parametric depth sampling approach to estimate 409 a depth at every pixel of the image that is consistent with orientation map. The geometric cues provided by the Geometric Reasoning Module are used by the Depth Sampling Module during inference to enforce orientation constraints, piecewise-planarity, and surface smoothness. The result is a dense reconstruction of the scene that is suitable for realistic, physically grounded editing, in accordance with one embodiment. As can be seen in FIG. 4a, this result can be represented as a set of depths (or depth map) and normals, which effectively provide a geometry model.

Extracting Geometric Priors.

The Geometric Reasoning Module can be programmed or otherwise configured with a geometric reasoning algorithm to obtain estimates of the camera's focal length, three dominant, mutually orthogonal scene directions, as well a sparse set of predicted surface orientations along one of these three directions. In particular, this algorithm classifies lines into three groups (excluding outliers) using a variant of RANSAC. As is known, RANSAC (RANdom SAmple Consensus) is an iterative non-deterministic algorithm for estimating parameters of a mathematical model from a set of observed data that includes outliers, with the probability that the result is reasonable increasing as the number or iterations increases. In any case, each group of line segments intersects at a vanishing point, and the vanishing points are assumed to be mutually orthogonal. That is, line segments within the same group will be perpendicular in 3D, and line segments in different groups are mutually orthogonal. Using these directions and groups of lines as guides, a set of planes oriented along these directions are generated for regions of the scene where the orientations can be estimated with confidence. In addition, it is known how to compute a simple pinhole camera (focal length f, and camera center ($c_0^x$, $c_0^y$)) and extrinsic parameters from three orthogonal vanishing points (computed during depth estimation). The following camera model can be used as the given projection operator at render time:

$$K = \begin{bmatrix} f & 0 & c_0^x \\ 0 & f & c_0^y \\ 0 & 0 & 1 \end{bmatrix}$$

Estimating Geometric-Based Depth.

In accordance with one embodiment, estimating geometric-based depth is carried out using a non-parametric, depth transfer approach for estimating dense, per-pixel depth from a single image. This approach requires a database of RGB-D (RGB+depth) images, and attempts to transfer depth from the dataset to a given input image in a non-parametric fashion using correspondences in appearance. However, only appearance cues are used (essentially scale-invariant feature transform or so-called SIFT features), and the addition of geometric information will aid in the depth transfer task. A continuous optimization problem is solved to find the most likely estimate of depth given in an input image.

In more detail, images in the RGB-D database are matched to the input and warped so that SIFT features are aligned. Karsch, et al (Karsch, Liu, Kang, *Depth Extraction from Video Using Non-Parametric Sampling*, 12th European Conference on Computer Vision, Florence, Italy, Oct. 7-13, 2012) propose to infer the depth map (denoted as D) by minimizing an objection function given by:

$$\operatorname*{argmin}_{D} E(D) = \sum_{i \in pixels} E_t(D_i) + \alpha E_s(D_i) + \beta E_p(D_i) \tag{Eq. 1}$$

where $E_t$ is the data term (depth transfer), $E_s$ enforces spatial smoothness, and $E_p$ is a database prior encouraging depth to look like the average depth in the dataset. α and β are parameters (α=10; β=0:5, in accordance with an example case). Thus, for a single image, the objective contains three terms: data ($E_t$), spatial smoothness ($E_s$), and database prior ($E_p$). The data term measures how close the inferred depth map D is to each of the warped candidate depths. By incorporating priors based on geometric reasoning, the results produced are more piecewise smooth. This is especially evident in the normal estimates that better capture the geometry of the images when compared to the noisy results computed by other techniques. An embodiment of the present invention reformulates the depth transfer objective function of Karsch et al. (Eq. 1) and infuses it with the geometric estimates previously described in the "Estimating geometric-based depth" section herein. The spatial smoothness (Es) and prior terms (Ep) are removed, as they are more-or-less heuristic priors, and replaced with geometric based priors. Terms are added to enforce a Manhattan World ($E_m$), constrain the orientation of planar surfaces ($E_o$), and impose geometric smoothness (Egs, spatial smoothness in 3D rather than 2D):

$$\operatorname*{argmin}_{D} E_{geom}(D) = \tag{Eq. 2}$$
$$\sum_{i \in pixels} E_t(D_i) + \lambda_m E_m(N(D)) + \lambda_o E_o(N(D)) + \lambda_{gs} E_{gs}(N(D))$$

where the weights are set empirically ($\lambda_m$=1, $\lambda_o$=10, and $\lambda_{gs}$=1, in accordance with one embodiment). Each of these new terms will now be described in greater detail.

Surface Normals from Dense Depth.

First, note that a surface normal can be recovered for each pixel in the image given a per-pixel estimate of depth. Plane fitting can be used for this, but for computational reasons, a local operator (N:R→R³) is used that considers the change in nearby depth values to estimate the surface orientation:

$$P(D) = D(x,y) K^{-1} [x,y,1]^T, \forall (x,y) \in \text{pixels}; \tag{Eq. 3}$$

$$V_x(D) = \nabla_x P(D), V_y(D) = \nabla_y P(D); \tag{Eq. 4}$$

$$N(D) = (V_x(D) \times V_y(D))/(\|V_x(D) \times V_y(D)\|); \tag{Eq. 5}$$

where × is the cross product operator. In addition, note that Vx and Vy are estimates of unique surface tangents, and their normalized cross product is thus the surface normal.

Manhattan World Prior.

Under the Manhattan World assumption, patches of a scene should always be oriented along one of the three dominant directions. These three directions are defined by the detected vanishing points, which encode a rotation matrix R=($R_x$, $R_y$, $R_z$)$^T$ defined as the rotation that takes the identity to the set of rescaled, unprojected vanishing points (R*I$\alpha$K$^{-1}$[$vp_x$, $vp_y$, $vp_z$]). To enforce such a prior, a penalty is added for surface normals not lying in parallel or perpendicular to one of these three directions:

$$pp(N, V) = \frac{1}{2} - \left| |N^T V| - \frac{1}{2} \right| \tag{Eq. 6a}$$

-continued $$E_m(N(D)) = \sum_{i \in pixels} pp(N_i, R_x) + pp(N_i, R_y) + pp(N_i, R_z) \quad \text{(Eq. 6b)}$$

The function pp is a negated and translated absolute value function that is small if the input vectors are either parallel or perpendicular, and otherwise large.

Orientation Constraints.

The orientation of some surfaces in the scene can also be inferred from the geometric reasoning, and this knowledge can be incorporated as a soft constraint on surface normals in regions which there is high confidence of the surface orientation. Let O be the set of pixels for which surface orientation can be confidently predicted, and $O_i^{map}$ is the predicted orientation at the ith pixel:

$$E_o(N(D)) = \sum_{i \in O} 1 - |N_i^T O_i^{map}| \quad \text{(Eq. 7)}$$

Geometric Smoothness.

In real scenes, not all planes will align with one of the three dominant directions. So, a simple smoothness prior can be incorporated, but smoothness is enforced in 3D rather than in the image plane, in accordance with an embodiment. The techniques provided herein encourage nearby normals to be pointing in the same direction, unless there are strong edges in the input image (assumed to be potential discontinuities in the normal field). The term can be modeled as:

$$E_{gs}(N(D)) = \sum_{i \in pixels} s_i^x \|\nabla_x N_i\| + s_i^y \|\nabla_y N_i\| \quad \text{(Eq. 8)}$$

where $\nabla_x$ and $\nabla_y$ are horizontal and vertical gradients in the image domain, and $s^x = (1 + e^{(\|\nabla_x I\| - 0.05)/0.01})^{-1}$ and $s^y = (1 + e^{(\|\nabla_y I\| - 0.05)/0.01})^{-1}$ are soft thresholds (sigmoidal functions) of input image (I) derivatives.

As will be appreciated in light of this disclosure, the Depth Sampling Module can be thought of as executing a combined optimization procedure. In summary, and in accordance with one example embodiment, the outputs of the Geometric Reasoning Module include: camera parameters (e.g., focal length, center of projection, rotation), three dominant planes in the image, and sparse estimates of the orientations of the pixels in the image. Given these three pieces of information, a depth can be estimated for the image that is consistent with these pieces of information. This can be accomplished, in one such embodiment, by sampling depth from an RGB-D dataset and optimizing that sampled depth to so that it satisfies all these constraints. The constraints are based on the normals/orientations at the pixels but there is a direct relationship between the normals and the depth that can be used to apply the constraints on the depth being estimated (Equations 3 through 5). In particular, the constraints used in accordance with one embodiment include: the normals at any point should be parallel or perpendicular to the three dominant directions estimated in the Geometric Reasoning Module (Equation 6); if the orientation is known at a point, the normals at that point should match that orientation (Equation 7); and the depth should be smooth in 3D (Equation 8). Applying all these constraints together in conjunction with depth sampling as provided herein allows the depth to be estimated at every pixel.

Lighting Estimation

Figure 5A:
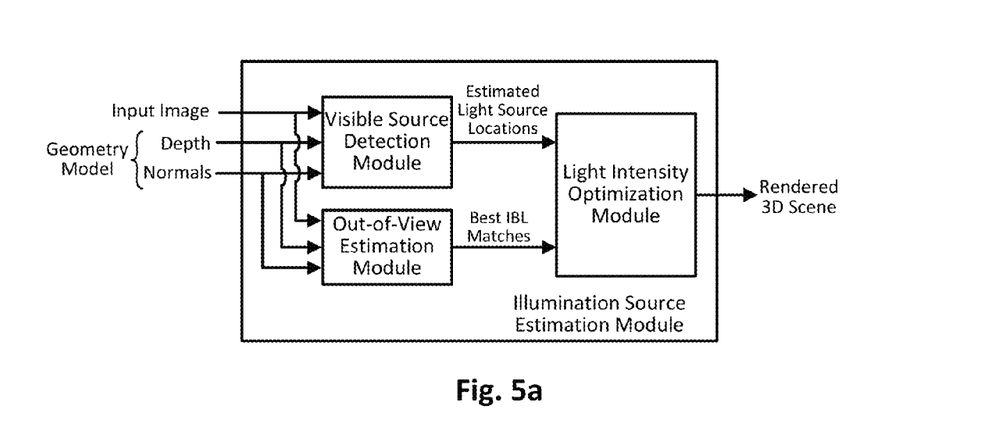
FIG. 5a illustrates an Illumination Source Estimation Module of the image editing system shown in FIG. 3, configured in accordance with an embodiment of the present invention.
Figure 5B:
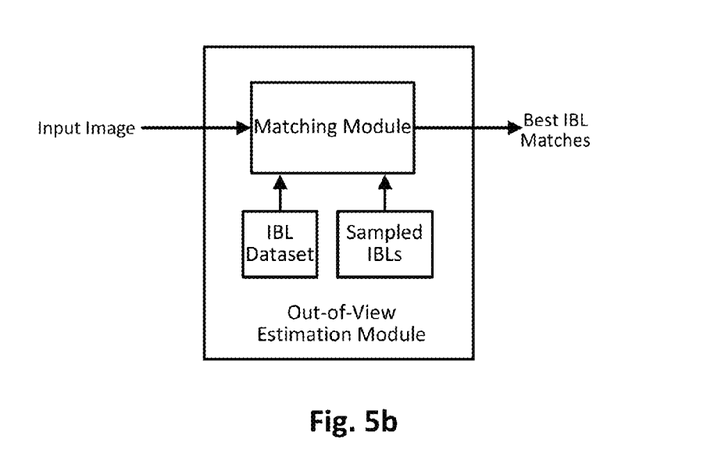
FIG. 5b illustrates a Scene Out-Of-View Estimation Module of the Illumination Source Estimation Module shown in FIG. 5a, configured in accordance with an embodiment of the present invention.
Figure 5C:
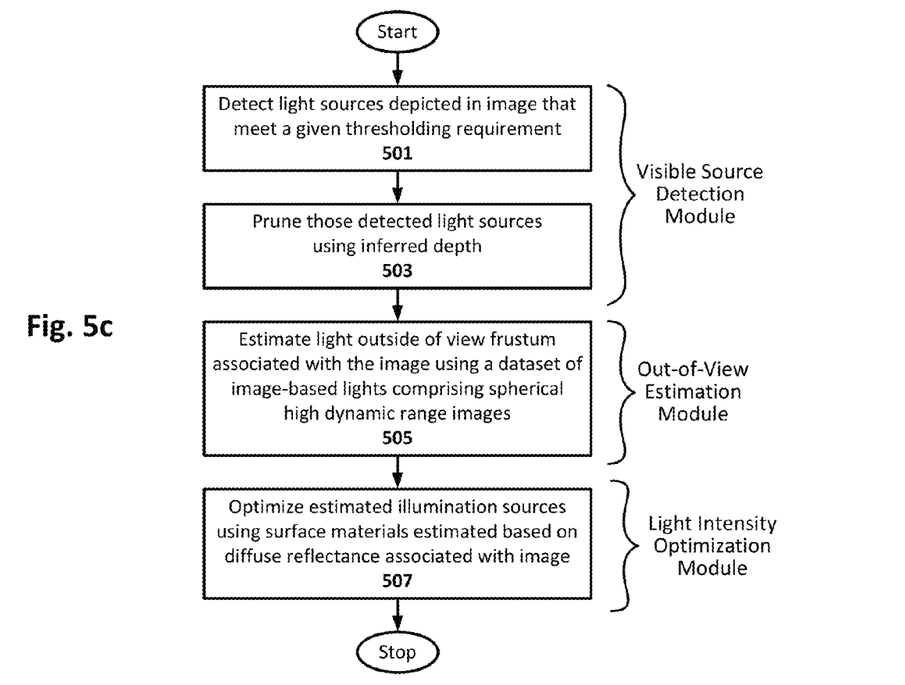
FIG. 5c illustrates a methodology that can be carried out by the Illumination Source Module depicted in 5a-b, in accordance with an embodiment of the present invention.

FIG. 5a illustrates the pipeline of the lighting estimation algorithm in accordance of one embodiment, and FIG. 5b illustrates an example out-of-view estimation portion of that pipeline. FIG. 5c illustrates an example methodology that can be carried out by the modules depicted in FIGS. 5a-b, in accordance with an embodiment. As can be seen in FIG. 5a, the Illumination Source Module includes a number of sub-modules including a Visible Source Detection Module, an Out-of-View Estimation Module, and a Light Intensity Optimization Module. As previously explained, each of these modules may be implemented in software, hardware, firmware or any combination thereof, and the degree of modularity may vary from one embodiment to the next, with the overall resulting functionality being as variously described herein.

In operation, the Visible Source Detection Module light is programmed or otherwise configured to detect light sources in the input image with automatic thresholding, and to prune/cull those detected sources using the inferred depth (e.g., removing detections if they lie on the floor). To estimate light outside of the view frustum, the Out-of-View Estimation Module is configured with (or otherwise has access to) a dataset of image-based lights or so-called IBLs (spherical HDR images). Each spherical image in the IBL dataset included in or otherwise accessible by the Out-of-View Estimation Module is subsampled into many rectilinear projections and matched to the input image by the Matching Module of the Out-of-View Estimation Module. The top matching candidate IBLs are used as distinct sources of light (generally designated as best IBL matches in FIG. 4b). The Light Intensity Optimization Module is configured to receive the estimated light source locations provided by the Visible Source Detection Module and the best IBL matches provided by the Out-of-View Estimation Module, and to optimize the source intensities to produce a rendering of the scene that closely matches the input image. Thus, a physical lighting solution can be automatically extracted or otherwise estimated from the image using the automatically estimated geometry provided by the Depth Estimation Module as a guide. The spatial location of light sources present within the image can be estimated, and with a dataset of real world illumination environments, the light outside of the camera's view can be estimated. Then, the relative intensities of each light source can be estimated by ensuring that the synthetic image (as rendered with the estimated geometry and light estimates) best matches the input image. Each of the three main sections of the lighting estimation pipeline shown in FIGS. 5a-b will now be discussed in more detail, including: estimation of illumination visible in the image, estimation of illumination outside of the view frustum, and intensity estimation through rendering.

Illumination Visible in the Image.

To detect potential sources of light within the image, the Visible Source Detection Module is programmed or otherwise configured to threshold the image, as shown at 501 of the methodology depicted in FIG. 5c. For instance, and in accordance with one example embodiment, all pixels with intensity higher than the $95^{th}$ percentile are marked as potential sources. To remove spurious and small detections, the Visible Source Detection Module can be further configured to perform an opening operation on the thresholded image (binary erosion followed by dilation). The Visible Source Detection Module can then cluster the thresholded image into its connected components (in 2D), and reconstruct the detected sources in 3D using the estimated depth as previously described with respect to FIGS. 4a-b.

In more detail and in accordance with an embodiment, the detected sources can be pruned as shown at 503 in FIG. 5c by removing any connected components which have a majority of upward facing normals (calculated from the depth using Equation 5), implying that this source is lying on the ground. Assuming that no light sources are on the ground (or facing upwards), it is a reasonable conclusion to remove these clusters from the thresholded image. For each remaining connected component (cluster) in the thresholded image, the 3D position of each pixel in a cluster is identified by un-projecting the pixel using the pixel's depth and the projection operator K. Write D as the estimated depth map, and (x, y) as a pixel's position in the image plane, then the 3D position of the pixel is then computed as follows $$X = D(x,y)K^{-1}[x,y,1]^T \quad \text{(Eq. 9)}$$

A polygonal representation of each light source can then be obtained by fitting a 3D quadrilateral to each cluster. Notice that this only provides the location/position of the light sources; how to estimate the intensity below is discussed in turn, with respect to the Light Intensity Optimization Module.

Illumination Outside of the View Frustum.

As can be seen with further reference to FIG. 5c, the methodology further includes estimating 505 light outside of the view frustum associated with the input image using a dataset of image-based lights comprising spherical high dynamic range images. Each spherical image can be sub-sampled into rectilinear projections and matched to the image and one or more top matching candidate image based lights are used as distinct sources of light. In more detail, estimating lighting from behind the camera can be a difficult task in single-image illumination estimation. To solve this task in accordance with an embodiment of the present invention, a data driven approach is used herein, utilizing a dataset of N real-world, image-based lighting environments (IBLs) stored in the equirectangular (latitude-longitude) domain. In one such embodiment, N is greater than 200. The IBL images can be collected from any number of suitable sources, such as from the High-Resolution Light Probe Image Gallery maintained by the University of Southern California (publically accessible via the Internet at URL: http://gl.ict.usc.edu/Data/HighResProbes) and the sIBL archive (publically accessible via the Internet at URL: http://www.hdrlabs.com/sibl/archive-.html), and/or any other suitable source for IBL images. Note that each IBL can be configured with the same or otherwise sufficiently close mean pixel value (such as 0.5 or other suitable mean pixel value), so that the IBL dataset contains comparable lighting value.

An assumption that can be made, in accordance with an embodiment, is that if two photographs have similar appearance, then the illumination environment beyond the photographed region will be similar as well. In the limit, if the IBL dataset contained every photograph and illumination environment, this would of course be the case. However, directly matching IBLs to images should be avoided since the domains differ greatly. Instead, match images to IBLs can be computed based on rectilinear projections of the IBL. To this end, the Out-of-View Estimation Module is programmed or otherwise configured to sample each IBL into N rectilinear projections at different points on the sphere and at varying fields-of-view, and match these projections to the input image using a variety of features (in one embodiment, N=108: 12 evenly distributed horizontal samples; ×3 vertical samples $$[-\frac{\pi}{2}, 0, \frac{\pi}{2}];$$

×3 fields-of-view 60°, 80°, 100°).

After sampling the dataset, the Matching Module of the Out-of-View Estimation Module is further programmed or otherwise configured to compute a matching score between each image and IBL sample (using spatial pyramids), and the top k matches are found over the entire dataset. In one such embodiment, k=3, although other embodiments may use few or more of the best matches found. Note that each match also indicates the orientation at which the rectilinear sample came from, so the IBL can be rotated to make this direction forward. In particular, the IBL can be oriented so that the sample is now in the center of the estimated depth map.

The matching operation carried out by the Matching Module of the Out-of-View Estimation Module results in a set of candidate IBLs that can be combined with the estimated light source locations identified by the Visible Source Detection Module so as to create a complete illumination model for the image. There are many ways to accomplish this task. In one embodiment, the Light Intensity Optimization Module is programmed or otherwise configured to combine the candidate IBLs to create one optimal IBL for the image, and then uses this optimal IBL in conjunction with the visible lighting identified by the Visible Source Detection Module to model the scene. In another embodiment, the Light Intensity Optimization Module is configured to consider each candidate IBL as an independent light source whose contribution to the scene is computed through an optimization over all the identified light sources.

Using an Optimal IBL.

Having found a set of candidate IBLs that approximately match the input photograph, it is desired to recover an optimal IBL that represents the illumination in the photograph well. To this end, it is reasonable to hypothesize that this optimal IBL can be described as a spatially-varying linear combination of the candidate IBLs. This overcomes issues related to the size of the IBL dataset. While the dataset itself might be small, the space of linear combinations of the IBLs in the dataset is very large, and by interpolating between suitable IBLs, new ones that are not part of the dataset can be hallucinated. The optimal IBL, L, is therefore given by:

$$L(w) = \sum_{i=1}^{k} \sum_{j} w_{ij} c_i \quad \text{(Eq. 10)}$$

where $C_i$ represents the k candidate IBLs, and $w_{ij}$ represents the spatially-varying per-IBL weights. In addition, the weights for the optimal IBL can be inferred by minimizing the energy term:

$$\operatorname*{argmin}_{w} E(w) = \quad \text{(Eq. 11)}$$

$$H(L(w)) + \sum_{x \in pixels} |\nabla L(w)|_x^\alpha + m_x \|L(w) - I\|_x + \sum_{i,j} \left| w_i j, \right.$$

$$\text{subject to} \sum_{i \in candidates}$$

$$w_i j = 1, \forall j$$

Here, the first two terms are based on the statistics of natural illumination and encourage low entropy and heavy-tailed gradients, the third term forces the optimal IBL to contain the projected images, and the last term encourages sparse weights. As will be appreciated in light of this disclosure, the optimal IBL is better in many cases than a single IBL from the dataset, or an IBL constructed from the image using conventional techniques. While the optimal IBL estimated using this approach is useful for many applications, it is further desirable as indicated herein to combine it with the illumination visible in the image to produce more accurate lighting estimates, in accordance with some embodiments. To this end, a technique for combining the light sources detected in the scene with the matching candidates IBL to reconstruct the illumination will now be provided.

Intensity Estimation Through Rendering.

As can be further seen with reference to FIG. 5c, the methodology further includes optimizing 507 the estimated illumination sources using surface materials estimated based on diffuse reflectance associated with the image. In more detail and in accordance with an embodiment, given an estimate of the location of light sources within (provided by the Visible Source Detection Module), as well as a set of IBLs representing the illumination outside the image (provided by the Out-of-View Estimation Module), the Light Intensity Optimization Module can estimate the relative intensities of the sources, in accordance with an embodiment of the present invention. Assume that the exact geometry and material of the scene (including light source positions) are known. In such a case, it is possible to estimate the intensities of the sources by tweaking the intensities until a rendered version of the scene matches the original image (up to an ambiguity caused by some scene configurations, e.g., large diffuse regions might look the same under different light intensities). In reality, exact geometry/materials are not always known, but it can be further assumed that the automatic estimates provided as described herein are sufficient, and the rendering procedure can be applied to provide reasonable results.

In more detail, for purposes of discussion let $L_i$ be the intensity of the $i^{th}$ light source, I is the input image, and R(L) is the scene rendered with the given lights (which can either be the in-frame lights estimated by the Visible Source Detection Module and/or the IBLs matched by the Out-of-View Estimation Module). In addition, the rendering described herein used not only geometry provided by the Depth Estimation Module, but also surface materials provided by the Diffuse Reflectance Module (which as previously explained can be implemented to use color retinex, which assumes a Lambertian model, to estimate a diffuse material for each pixel in the visible scene, in accordance with an embodiment of the present invention). With this given information, the Light Intensity Optimization Module is configured to find the intensity of each light source by matching the input and rendered images, so as to minimize:

$$\operatorname*{argmin}_{L} = \sum_{i \in pixels} \|I_i - R_i(L)\| \qquad \text{(Eq. 12)}$$

This optimization can be inefficient, as it uses a new image to be rendered for each function evaluation. However, the notion that light is additive can be advantageously exploited, and the rendering R can be defined as a linear combination of "basis" renders. In more detail, the scene can be rendered (using the estimated geometry and diffuse materials provided by the Depth Estimation and Diffuse Reflectance Modules, respectively) using only one light source at a time (e.g., $L_k=1$, $L_j=0$ $\forall j \neq k$, which implies $L=e_k$). This results in i rendered images, and a new render function can be written $R'(w)=C(\Sigma_k w_k R(e_k))$, where C is the camera response function, and $R(e_i)$ is the scene rendered with only the $i^{th}$ light source (which can be precomputed prior to optimization). It can be assumed that the camera response can be modeled as an exponent, e.g. $C(x)=x^\gamma$. This allows equation 12 to be rewritten as:

$$\operatorname*{argmin}_{w,\gamma} = \sum_{i \in pixels} \left\| I_i - \left[ \sum_{k \in sources} w_k R(e_k) \right]^\gamma \right\| \qquad \text{(Eq. 13)}$$

which can be solved efficiently with a nonlinear least squares solver. For instance, in one example embodiment, the damped least-squares (DLS) method or so-called the Levenberg-Marquardt algorithm (LMA) can be used. The computed weights (w) can be directly translated into light intensities (L), thereby providing an entire model of the scene (geometry from the Depth Estimation Module, surface materials from the Diffuse Reflectance Module, and light source positions/intensities from the Light Intensity Optimization Module).

As will be appreciated, the techniques provided herein have a number of advantages to conventional so-called "optimization through-rendering" techniques. For instance, the camera response function can be estimated jointly during the optimization, and can be used as a separate application (e.g., camera response from a single image). In addition, the optimization procedure provided herein is faster than conventional methods in that the disclosed techniques recognize that light is additive, thereby allowing the editing system to solve for a simple linear combination of rendered images, rather than rerendering the image for each function evaluation as conventionally done.

A scene model produced in accordance with an embodiment of the present invention can be readily extendable to support operations such as point-and-click object insertion, on-the-fly lighting changes, and post-process depth of field modifications. Additional uses for such scene models will be apparent in light of this disclosure, such as for gaming and videos. For instance, virtual staging is an application for the object insertion methodologies provided herein (for scene development in a game or video). The disclosed techniques may also be applied to other physically grounded editing operations as well, such as deleting from a scene or moving objects in a scene, or adding physically-based animations when inserting objects (e.g., dragging a table cloth over a table). The disclosed techniques may also be extended to jointly infer a scene all at once (rather than serially), which may lead to improved scene estimates, and possibly even allow for removal of the Lambertian assumption executed by the Diffuse Reflectance Module, in accordance with one example embodiment of the present invention. An editing system configured in accordance with some embodiments can handle complicated illumination phenomena like caustics and dispersion. In addition, the disclosed techniques can be applied to arbitrary images, and need not make any explicit assumptions about the scene geometry. Also, note that the disclosed techniques produce plausible results when the light sources are not visible in the image.

Comparative Results

A qualitative comparison was carried out using four different illumination estimation procedures, so as to allow for comparison of their respective impact on insertion results. The methods used in the comparison include:

1) A variant of the method described in the paper by Khan, Reinhard, Fleming, and Bülthoff ("Image-Based Material Editing" published by ACM Transactions on Graphics (TOG)—Proceedings of ACM SIGGRAPH 2006, volume 25 issue 3, July 2006, pp. 654-663). This paper describes an image-wrapping method that includes projecting the input image onto a hemisphere, duplicating it, and using this as the illumination environment. The variant used for purposes of this comparison is that the input images used for the comparison were LDR rather than HDR as Khan used. This paper is hereinafter referred to as Khan.

2) The method described in the paper by Karsch, Hedau, Forsyth, and Hoiem ("Rendering Synthetic Objects into Legacy Photographs" published by ACM Transactions on Graphics (TOG)—Proceedings of ACM SIGGRAPH Asia 2011, volume 30 issue 6, December 2011, article No. 157). This paper describes a semi-automatic method to realistically insert synthetic objects into existing photographs by re-rendering the image for each function evaluation. This paper is hereinafter referred to as Karsch.

3) A variant of the light estimation methodologies provided herein, wherein instead of using natural illumination IBLs or so-called priors, a spherical 8×4 grid of area light sources outside the view frustum is initialized, but still optimized as provided herein). This paper is hereinafter referred to as "no prior").

4) A light estimation method as provided herein, in accordance with one embodiment.

Note that all of these methods are automatic and use estimated geometry, with the exception of Karsch (which is semi-automatic and uses box-like geometry). Upon visual comparison, it appears that a methodology configured in accordance with an embodiment of the present invention provides significantly better results than existing approaches, and is comparable to methods which require a good deal of user interaction. In addition, note that the methodologies provided herein work for scenes with no visible light sources as well as for scenes with complex structure (i.e., not boxy) in accordance with an embodiment, wherein such scenes are not well-suited for the insertion method of Karsch. It is further noteworthy that results achieved using an embodiment of the present invention and results using the semi-automatic Karsch method appear different from one another, yet the illumination appears plausible in each when viewing one recovered image at a time. To this end, the techniques operate differently and produce different results.

Thus, the techniques can be implemented a new class of image editor that allows users to make physically meaningful edits to an image with ease. A software application so configured supports realistic object insertion and relighting and can be applied to legacy, LDR images. These interactions are facilitated by an automatic scene inference algorithm, which includes single image depth estimation and data-driven illumination inference, in accordance with one embodiment. Results produced by the editing system appear realistic, and provide good evidence that the automatic technique achieves the same level of photorealism as methods requiring a non-trivial amount of user interaction.

Numerous variations and configurations will be apparent in light of this disclosure. One example embodiment of the present invention provides a method for automatically estimating illumination sources associated with a digital image depicting a scene. The method includes detecting light sources depicted in the image that meet a given thresholding requirement, pruning the detected light sources using inferred depth, and estimating light outside of the view frustum associated with the image using a dataset of image-based lights comprising spherical high dynamic range images. Each spherical image is sub-sampled into rectilinear projections and matched to the image and one or more top matching candidate image based lights are used as distinct sources of light. In some cases, the method is triggered in response to a request to insert a digital object into the digital image. In some cases, pruning the detected light sources using inferred depth includes removing a detection if it is associated with an unlikely location for an illumination source. In some cases, the inferred depth is provided by estimating camera focal length, three dominant mutually orthogonal scene directions, and a sparse set of predicted surface orientations along one of these three directions. In some cases, the inferred depth is provided by: detecting edges in the input image; linking edge pixels and fitting line segments to those edges; recovering vanishing points from the identified line segments; and computing an orientation map from the line segments and vanishing points. In one example such case, the method further comprises estimating a depth at every pixel of the image that is consistent with the orientation map, which can be facilitated by a dataset of RGB-D images. In some cases, the inferred depth is provided by: estimating the focal length of the camera and a sparse surface orientation map based on geometric constraints depicted in the image; and applying a non-parametric depth sampling approach that uses a dataset of RGB-D images to estimate a depth at every pixel of the image that is consistent with the orientation map, and to provide a set of estimated depths and normals that represent a geometry model of the scene. In some cases, the method further includes optimizing estimated illumination sources using surface materials estimated based on diffuse reflectance associated with the image. In some cases, the diffuse reflectance is provided by estimating a spatially-varying diffuse material albedo for each pixel in the scene based on comparison to a decomposed dataset, wherein an image for each of a variety of physical objects is decomposed into components including Lambertian shading and reflectance so as to provide the decomposed dataset. In some cases, the method further includes producing a rendering of the scene depicted in the image. In some cases, the method is part of a cloud-based service.

Another embodiment of the present invention provides a computer program product encoded with instructions that when executed by one or more processors cause a process to be carried out, the process comprising: automatically estimate a dense depth associated with a digital image depicting a scene; automatically estimate diffuse reflectance associated with the image; and automatically estimate illumination sources associated with the image based on the dense depth and diffuse reflectance. In some cases, the process further includes receive a request to insert a digital object into the digital image, and automatically synthesize a new view of the image including the inserted object and a relit scene using a 3D scene model that reflects each of the dense depth, diffuse reflectance, and illumination sources. In some cases, the process to estimate dense depth comprises: estimate camera focal length; detect edges in the input image; link edge pixels and fit line segments to those edges; recover vanishing points from the identified line segments; compute an orientation map from the line segments and vanishing points; and estimate a depth at every pixel of the image that is consistent with the orientation map. In some cases, the process to estimate diffuse reflectance comprises: estimate a spatially-varying diffuse material albedo for each pixel in the scene based on comparison to a decomposed dataset, wherein an image for each of a variety of physical objects is decomposed into components including Lambertian shading and reflectance so as to provide the decomposed dataset. In some cases, the process to estimate illumination sources comprises: detect light sources depicted both inside and outside the view frustum associated with the input image; and optimize detected illumination sources using surface materials estimated based on the diffuse reflectance. In some cases, the process includes: produce a three-dimensional rendering of the scene using the estimated dense depth, diffuse reflectance, and illumination sources.

Another embodiment of the present invention provides a system that includes a Depth Estimation Module configured to automatically estimate dense depth associated with a digital image depicting a scene. The system further includes a Diffuse Reflectance Module configured to automatically estimate diffuse reflectance associated with the image; and an Illumination Source Estimation Module configured to automatically estimate illumination sources associated with the image based on the dense depth and diffuse reflectance. In some cases, the system includes an Input/Request Module configured to receive a request to insert a digital object into the digital image, and a View Synthesis Module configured to automatically synthesize a new view of the image including the inserted object and a relit scene using a 3D scene model that reflects each of the dense depth, diffuse reflectance, and illumination sources. In some cases, the Depth Estimation Module estimates dense depth by estimating camera focal length, three dominant mutually orthogonal scene directions, and a sparse set of predicted surface orientations along one of these three directions. In some cases, the Depth Estimation Module is configured to: detect edges in the input image; link edge pixels and fit line segments to those edges; recover vanishing points from the identified line segments; and compute an orientation map from the line segments and vanishing points. In some cases, the Depth Estimation Module is configured estimate a depth at every pixel of the image that is consistent with the orientation map, facilitated by a dataset of RGB-D images. In some cases, the Depth Estimation Module comprises: a Geometric Reasoning Module configured to estimate the focal length of the camera and a sparse surface orientation map based on geometric constraints depicted in the image; and a Depth Sampling Module configured to apply a non-parametric depth sampling approach that uses a dataset of RGB-D images to estimate a depth at every pixel of the image that is consistent with the orientation map, and to provide a set of estimated depths and normals that represent a geometry model of the scene. In some such cases, geometric cues provided by the Geometric Reasoning Module are used by the Depth Sampling Module during inference to enforce orientation constraints, piecewise-planarity, and surface smoothness. In some cases, the Diffuse Reflectance Module estimates diffuse reflectance by estimating a spatially-varying diffuse material albedo for each pixel in the scene based on comparison to a decomposed dataset, wherein an image for each of a variety of physical objects is decomposed into components including Lambertian shading and reflectance so as to provide the decomposed dataset. In some cases, the Illumination Source Estimation Module estimates illumination sources by detecting light sources depicted in the image that meet a given thresholding requirement, and then pruning those detected light sources using inferred depth provided by the Depth Estimation Module. In some cases, the Illumination Source Estimation Module estimates illumination sources by estimating light outside of the view frustum associated with the input image using a dataset of image-based lights comprising spherical high dynamic range images, wherein each spherical image is sub-sampled into rectilinear projections and matched to the input image and one or more top matching candidate image based lights are used as distinct sources of light. In some cases, the Illumination Source Estimation Module is further configured to optimize estimated illumination sources using surface materials estimated based on the diffuse reflectance and to produce a rendering of the scene. Variations will be apparent. For instance, another embodiment provides an image editing system comprising the system as variously defined in this paragraph.

Another embodiment of the present invention provides a method for automatically estimating dense depth associated with a digital image depicting a scene. The method includes estimating camera focal length, detecting edges in the image, linking edge pixels and fitting line segments to those edges, recovering vanishing points from the identified line segments, computing an orientation map from the line segments and vanishing points, and estimating a depth at every pixel of the image that is consistent with the orientation map, using a dataset of RGB-D images.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A method for automatically estimating illumination sources associated with a digital image depicting a scene, the method comprising:
   detecting light sources depicted in the digital image that meet a given thresholding requirement, the digital image comprising a plurality of pixels;
   estimating a dense depth associated with the digital image by
      estimating a focal length of a camera used to capture the digital image and a sparse surface orientation map based on geometric constraints depicted in the digital image,
      applying a non-parametric depth sampling approach that uses a dataset of RGB-D images to estimate a depth at every pixel of the digital image that is consistent with the sparse surface orientation map, and
      providing a set of estimated depths and normals that represent a geometry model of the scene, wherein geometric cues provided by the sparse surface orientation map are used in estimating the dense depth to enforce orientation constraints, piecewise-planarity, and surface smoothness;
   pruning the detected light sources using the estimated dense depth; and
   estimating light outside of a view frustum associated with the digital image using a dataset of image-based lights comprising spherical high dynamic range images, wherein each spherical image is sub-sampled into rectilinear projections and matched to the digital image, and wherein one or more top matching candidate image-based lights are used as distinct sources of light.

2. The method of claim 1, wherein the method is triggered in response to a request to insert a digital object into the digital image.

3. The method of claim 1, wherein pruning the detected light sources includes removing particular detected light source if it is associated with an unlikely location for an illumination source.

4. The method of claim 1, wherein estimating the dense depth further comprises estimating three dominant mutually orthogonal scene directions and a sparse set of predicted surface orientations along one of these three directions.

5. The method of claim 1, further comprising estimating a diffuse reflectance by estimating a spatially-varying diffuse material albedo for each pixel in the scene based on comparison to a decomposed dataset that comprises, for each of a variety of physical objects, an image that is decomposed into Lambertian shading and reflectance components.

6. The method of claim 1 further comprising rendering the scene depicted in the digital image.

7. The method of claim 1 wherein the method is part of a cloud-based service.

8. The method of claim 1, wherein estimating the dense depth further comprises:
    detecting edges in the digital image;
    linking edge pixels and fitting line segments to those edges;
    recovering vanishing points from the line segments; and
    computing the sparse surface orientation map from the line segments and vanishing points.

9. The method of claim 1, further comprising optimizing the estimated light using surface materials estimated based on diffuse reflectance associated with the digital image.

10. A non-transitory computer-readable medium having instructions encoded thereon that when executed by one or more processors cause a process to be carried out, the process comprising:
    automatically estimate a dense depth associated with a digital image depicting a scene
        estimating a focal length of a camera used to acquire the digital image and a sparse surface orientation map based on geometric constraints depicted in the digital image,
        applying a non-parametric depth sampling approach that uses a dataset of RGB-D images to estimate a depth at every pixel of the digital image that is consistent with the sparse surface orientation map, and
        providing a set of estimated depths and normals that represent a geometry model of the scene, wherein geometric cues provided by the sparse surface orientation map are used in estimating the dense depth to enforce orientation constraints, piecewise-planarity, and surface smoothness;
    automatically estimate diffuse reflectance associated with the digital image; and
    automatically estimate illumination sources associated with the digital image based on the dense depth and diffuse reflectance.

11. The non-transitory computer-readable medium of claim 10, the process further comprising:
    receive a request to insert a digital object into the digital image; and
    automatically synthesize a new view of the digital image including the digital object and a relit scene using a 3D scene model that reflects each of the dense depth, diffuse reflectance, and illumination sources.

12. The non-transitory computer-readable medium of claim 10, wherein estimating the dense depth further comprises:
    detect edges in the digital image;
    link edge pixels and fit line segments to those edges;
    recover vanishing points from the line segments; and
    compute the sparse surface orientation map from the line segments and vanishing points.

13. The non-transitory computer-readable medium of claim 10, wherein:
    estimating the illumination sources further comprises detecting light sources depicted both inside and outside a view frustum associated with the digital image; and
    the process further comprises optimizing the estimated illumination sources using surface materials estimated based on the diffuse reflectance.

14. The non-transitory computer-readable medium of claim 10, wherein the process further comprises:
    produce a three-dimensional rendering of the scene using the estimated dense depth, diffuse reflectance, and illumination sources.

15. The non-transitory computer readable medium of claim 10, wherein estimating the diffuse reflectance further comprises estimating a spatially-varying diffuse material albedo for each pixel in the scene based on comparison to a decomposed dataset that comprises, for each of a variety of physical objects, an image that is decomposed into Lambertian shading and reflectance components.

16. An image editing system comprising a memory device and a processor that is operatively coupled to the memory device, wherein the processor is configured to execute instructions stored in the memory device that, when executed, cause the processor to carry out an image editing process that comprises:
    estimating dense depth associated with a digital image depicting a scene, the digital image comprising a plurality of pixels;
    estimating diffuse reflectance associated with the digital image by estimating a spatially-varying diffuse material albedo for each pixel in the scene based on comparison to a decomposed dataset that comprises, for each of a variety of physical objects, an image that is decomposed into Lambertian shading and reflectance components;
    estimating illumination sources associated with the digital image by
        detecting light sources depicted in the digital image that meet a given thresholding requirement and pruning the detected light sources using the estimated dense depth,
        estimating light outside of a view frustum associated with the digital image using a dataset of image-based lights comprising spherical high dynamic range images, wherein each spherical image is subsampled into rectilinear projections and matched to the digital image, and wherein one or more top matching candidate image-based lights are used as distinct sources of light, and
        optimizing the estimated illumination sources using surface materials estimated based on the diffuse reflectance; and
    producing a rendering of the scene.

17. The system of claim 16, wherein the image editing process further comprises:
    receiving a request to insert a digital object into the digital image; and
    synthesizing a new view of the digital image including the digital object and a relit scene using a 3D scene model that reflects each of the dense depth, diffuse reflectance, and illumination sources.

18. The system of claim 16, wherein the dense depth is estimated by estimating a focal length of a camera used to capture the digital image, three dominant mutually orthogonal scene directions, and a sparse set of predicted surface orientations along one of these three directions.

19. The system of claim 16, wherein estimating the dense depth further comprises:

detecting edges in the digital image;
linking edge pixels and fitting line segments to those edges;
recovering vanishing points from the line segments; and
computing an orientation map from the line segments and vanishing points.

20. The system of claim 19, wherein, facilitated by a dataset of RGB-D images, estimating the dense depth further comprises estimating a depth at every pixel of the digital image that is consistent with the orientation map.

21. The system of claim 16, wherein estimating the dense depth further comprises:
   estimating a focal length of a camera used to capture the digital image and a sparse surface orientation map based on geometric constraints depicted in the digital image;
   applying a non-parametric depth sampling approach that uses a dataset of RGB-D images to estimate a depth at every pixel of the digital image that is consistent with the sparse surface orientation map; and
   providing a set of estimated depths and normals that represent a geometry model of the scene;
   wherein geometric cues provided by the sparse surface orientation map are used in estimating the dense depth to enforce orientation constraints, piecewise-planarity, and surface smoothness.

* * * * *

UNITED STATES PATENT AND TRADEMARK OFFICE
CERTIFICATE OF CORRECTION

| | |
|---|---|
| PATENT NO. | : 9,299,188 B2 |
| APPLICATION NO. | : 13/962604 |
| DATED | : March 29, 2016 |
| INVENTOR(S) | : Kevin Karsch et al. |

Page 1 of 1

It is certified that error appears in the above-identified patent and that said Letters Patent is hereby corrected as shown below:

In the Claims

Column 18, line 65, Claim 3, please replace "removing particular" with --removing a particular--.

Column 19, line 30, Claim 10, please replace "a scene" with --a scene by--.

Signed and Sealed this
Seventeenth Day of May, 2016

Michelle K. Lee
*Director of the United States Patent and Trademark Office*